United States Patent [19]

Hirschey et al.

[11] Patent Number: 5,154,942
[45] Date of Patent: Oct. 13, 1992

[54] AERATED REDUCED-FAT CREME AND PROCESS OF MAKING

[75] Inventors: John A. Hirschey, Brentwood; Lynn F. Ragan, Ballwin, both of Mo.

[73] Assignee: Continental Baking Company, St. Louis, Mo.

[21] Appl. No.: 683,902

[22] Filed: Apr. 11, 1991

[51] Int. Cl.$^5$ .............................................. A23G 3/00
[52] U.S. Cl. .................................. 426/572; 426/613; 426/659; 426/578; 426/804
[58] Field of Search ............... 426/572, 659, 804, 578, 426/661

[56] References Cited

U.S. PATENT DOCUMENTS

| | | | |
|---|---|---|---|
| 3,809,764 | 5/1974 | Gabby et al. | 426/163 |
| 3,936,391 | 2/1976 | Gabby et al. | 252/356 |
| 3,949,102 | 4/1976 | Hellyer et al. | 426/566 |
| 4,273,795 | 6/1981 | Bosco et al. | 426/602 |
| 4,454,113 | 6/1984 | Hemker | 424/63 |
| 4,473,594 | 9/1984 | Miller et al. | 426/578 |
| 4,610,884 | 9/1986 | Lewis et al. | 426/103 |
| 4,670,272 | 6/1987 | Chen et al. | 426/572 |
| 4,707,374 | 11/1987 | King et al. | 426/572 |
| 4,752,494 | 6/1988 | Tang et al. | 426/572 |
| 4,761,292 | 8/1988 | Augustine et al. | 426/572 |
| 4,834,991 | 5/1989 | Porcello et al. | 426/572 |
| 4,840,813 | 6/1989 | Greenberg et al. | 426/565 |
| 4,865,859 | 9/1989 | Porcello et al. | 426/572 |

*Primary Examiner*—Jeanette Hunter
*Attorney, Agent, or Firm*—Virgil B. Hill

[57] ABSTRACT

An aerated reduced-fat creme and process for its production is disclosed which is suitable as a filling for baked goods such as snack cakes. The process comprises blending a starch composition containing sugar and a pregelantinized instant starch with an aqueous syrup to form a substantially smooth paste. Water is then added to hydrate the starch followed by the addition of a vegetable shortening, and an emulsifier combination comprising a polyglycerol ester and an alkali stearoyl lactylate and sugar. This mixture is then blended and aerated to provide a product with a smooth, homogeneous appearance and creamy texture.

14 Claims, No Drawings

AERATED REDUCED-FAT CREME AND PROCESS OF MAKING

BACKGROUND OF THE INVENTION

The present invention relates to an aerated reduced-fat creme which is suitable as a filling for baked goods as well as a process for its production.

Consumers have become increasingly interested in products which have a reduced-fat content. This is especially true with products such as dairy toppings, frozen desserts and similar types of products. For the most part, these products normally contain fat levels which are relatively high, and it is this high fat level which provides these products with their appetizing flavor and appearance. While these products are organoleptically desirable, the high level of fat increases the cost of the product and creates an acceptance problem for the consumer. It is therefore desirable to reduce the fat level in products of this type in order to improve their appeal. While formulating a low-fat product is relatively easy, it is much more difficult to formulate a product that has similar organoleptic properties, particularly in texture and taste.

The above problem is even more pronounced with products that are intended to be shelf-stable at ambient temperatures for a limited period of time. Products of this type include creme filled snack cakes or similar types of baked goods. These products have a very creamy, smooth appearance and for the most part rely on high levels of fats, particularly animal fats to impart these properties to the creme filling. The substitution of vegetable fats at significantly reduced levels in creme fillings have also, up to now, significantly altered the texture, appearance or flavor of these products. A significant need therefore exists for a low-fat substitute that has comparable taste, texture and appearance to a creme product containing a relatively high level of fat.

It is therefore an object of the present invention to provide a reduced-fat creme duct which has reduced-fat level but has the same organoleptic properties as a creme product of a much higher fat content.

It is also an object to provide a reduced-fat creme product of the above type which is aerated and can be used as a shelf-stable filling in baked goods such as snack cakes.

These and other objects are achieved pursuant to the present invention as set forth below.

SUMMARY OF THE INVENTION

The present invention involves a process for the production of an aerated reduced-fat creme product that is a suitable filling for shelf stable baked goods such as snack cakes. The reduced-fat creme filling is prepared by blending a starch composition which comprises primarily sugar and a pregelatinized instant starch with an aqueous syrup to form a substantially smooth mixture. This smooth mixture is then blended with sufficient water in order to hydrate and swell the starch component. The hydrated starch composition is then mixed with a vegetable shortening composition which includes at least several specific emulsifiers that are essential to the result achieved in the present invention. The specific emulsifiers which are used are a combination of a polyglycerol ester such as triglycerol monostearate and an alkali stearoyl lactylate such as sodium stearoyl lactylate. These can be added separately or to the vegetable shortening. The vegetable shortening and the specific emulsifiers are mixed with the hydrated starch composition and an additional quantity of sugar. These materials are then blended to form a creme. The resultant creme is then aerated in order to achieve a lower specific gravity. Aeration of the creme improves it's smoothness and texture as well as it's shelf stability. The aerated creme has a reduced-fat level with equivalent texture, taste and appearance to conventional aerated cremes of relatively high fat content. The reduced-fat creme is suitable for use as a shelf-stable filling in baked goods.

The reduced-fat aerated creme of the present invention has equivalent texture and taste to that of a high-fat creme because of several unique factors. These factors include the use of a vegetable shortening and a unique combination of emulsifiers which provide the creme with the required texture and appearance. The order of mixing of the various ingredients also represents a significant factor in achieving the noted result including the manner in which the starch composition is added is important in order to achieve a smooth texture and appearance without lumping.

DESCRIPTION OF THE PREFERRED EMBODIMENTS

The reduced-fat aerated creme of the present invention represents a significant improvement over cremes containing high levels of fat since lower levels of vegetable shortening are used rather than shortenings based on animal fats. Higher starch levels provide the creme with the requisite appearance and texture. The production of the aerated reduced-fat creme of the present invention represents more than a simple substitution of one ingredient for the other. The starch and the vegetable shortening will not produce an aerated creme without at least the specific emulsifier combination described below. The manner in which the starch is added in the present process so as to avoid undesirable lumping of the starch also is critical in providing the creme with a comparable texture and smoothness to that of a higher fat product. The specifics of these factors which are significant relative to the present invention are described in more detail below.

The selection of a suitable starch is an important factor in formulating the aerated creme of the present invention. Preferably, the starch is an instant pregelatinized modified starch such as Instant Sta Slim 142 and Mira Gel 463, both of which are available from the A.E. Staley Co., Decatur, Ill. Mixtures of various pregelatinized modified instant starches are also suitable for use in the present invention.

The starch composition comprises dry materials, is separately blended and can additionally include various dry ingredients that improve the overall quality, flavor, or appearance of the creme. The exact additional components or the amount thereof that are included are not critical to the present invention and typical materials include antimicrobials to improve shelf-life such as sorbic acid or salts thereof. Other materials can include dry flavorings such as salt or bulking agents such as carboxymethylcellulose, as well as titanium dioxide pigments to improve the whiteness of the creme.

A major component of the starch composition is sugar which can be dry blended with the materials described above. Preferred amounts of sugar are about 50 to 80% by weight of the starch composition. Preferred levels of the instant pregelatinized modified starches in the starch composition are about 20 to 50% by weight of the starch composition. The above percentages are expressed on a dry weight basis.

The starch composition is initially dispersed in an aqueous syrup to form a substantially smooth mixture. The aqueous syrup contains insufficient water to hydrate the starches at this point since it is desirable to form a dispersion of the starches in the syrup to prevent lumping. Preferably, the aqueous syrup comprises a blend of a suitable syrup such as corn syrup in an amount of about 15 to 25% by weight of the creme on an as is basis and about 0 to 5% water by weight of the creme on an as is basis. The most preferred levels of water and corn syrup are about 4 and 21% by weight respectively. The present invention is not limited by the particular type of syrup used and can include a variety of corn syrups having a DE (dextrose equivalent) of about 42 to 95. Although not limiting to the present invention it is desirable to include any added water soluble flavors in the aqueous syrup to insure complete dispersal in the creme.

Following the separate dry blending of the components of the starch composition, the starch composition is blended with the aqueous syrup. Preferred amounts of the starch composition are about 10 to 20% by weight of the creme on an as is basis. A preferred amount of the aqueous syrup is about 20 to 25% by weight of the cream on an as is basis. Blending is carried out for a period of time to provide for complete dispersal of the starch without lumping. Once a substantially smooth mixture is achieved, then a sufficient quantity of water is added to the blend of starch and aqueous syrup, in order to substantially hydrate or swell the starch matrix. Preferably, the water that is added is at ambient temperature or below and the amount of water that is added is about 5 to 15% by weight of the creme with a most preferred level of addition of about 10% by weight of the creme on an as is basis. The amount of mixing time needed to achieve a substantially smooth mixture is not critical, but can typically vary between about 60 to 120 seconds.

After hydration of the starches, it is desirable to add a small quantity of gelatin to the mixture. Gelatin improves the shelf stability of the aerated creme and its addition at this point represents only a convenient but noncritical point of addition in the process. Preferred amounts of gelatin are about 0.1 to 0.4% by weight of the creme on an as is basis.

An important aspect of the present invention is the use of vegetable rather than animal based shortening or fat and its addition following dispersal and hydration of the starch composition. The addition of the shortening following hydration of the starch significantly improves shelf stability of the creme as compared to its addition prior to starch hydration. Therefore, an important aspect of the present invention is the order of addition of these two ingredients in conjunction with the composition of the vegetable shortening. In this regard, the vegetable shortening composition must include at least a unique combination of emulsifiers believed to be significant in achieving the desirable texture and appearance of the creme. While the use of an animal fat or much higher levels of fat would permit the use of a wide range of emulsifiers, the particular selection of vegetable shortening to result in a reduced-fat level, requires at least a specific emulsifier combination comprising a polyglycerol ester and an alkali stearoyl lactylate. The preferred emulsifiers are a blend of triglycerol monostearate and sodium stearoyl lactylate, in an amount of about 0.27–0.34% triglycerol monostearate and 0.1 to 0.2% sodium stearoyl lactylate, both expressed as % by weight of the creme on an as is basis. They can be separately added to the mixture or added as part of the vegetable shortening. It should be recognized that the vegetable shortening may contain additional emulsifiers that are conveniently added to these materials, such as mono and diglycerides, lecithin or other suitable materials, and the specific Combination noted above is intended to b added regardless of what other emulsifiers may be present in the shortening.

The vegetable shortening is added to the hydrated starch composition in a amount of at least about 8% and typically about 8 to 13% by weight of the creme and preferably about 12 to 13% by weight of the creme on an as is basis. The shortening and emulsifiers are blended with a further quantity of sugar, which is added in an amount of about 20 to 33% by weight of the creme on an as is basis. Other optional ingredients added at this point can include nonfat dry milk, sodium caseinate, as well as additional water. Preferred amounts of the above materials are 0 to 0.5%; 0.05 to 2%; 0 to 5% respectively expressed on an as is weight basis of the creme. The starch composition, sugar, and shortening are blended to form a creme mixture which has a specific gravity of about 0.85–1.0. The amount of time for mixing is not critical but typically will vary between about 1 to 3 minutes.

Following formation of the creme, air is injected to aerate the creme and reduce the specific gravity of the creme below 0.7, and preferably to about 0.6–0.65. The aerated reduced-fat creme produced as described above is then suitable for use as a filling for baked goods or snack cakes.

The following examples represent specific but non limiting embodiments of the present invention.

EXAMPLE 1

A batch of approximately 1000 lbs. of an aerated reduced-fat creme filling for a snack cake was prepared according to the following procedure.

The following ingredients were placed in a 1000 lb. slurry mixer in the indicated amounts and mixed for approximately 15 seconds to form an aqueous syrup.

| Ingredients | Weight (lb.) |
| --- | --- |
| Corn Syrup | 210.0 |
| Water | 40.0 |
| Butter Lemon Vanilla Flavoring | 3.0 |

Separately a starch composition was prepared by dry blending the following ingredients in the indicated amounts.

| Ingredient | Wt. (lb.) | % by wt. of Starch Compos. |
| --- | --- | --- |
| Sugar | 56.50 | 56.5 |
| Pregelatinized Modified Instant Starch Mixture "Sta Slim 142" manufactured by A. E. Staley, Decatur, Illinois | 20.0 | 20.0 |
| "Mira Gel 463" manufactured by A. E. Staley, Decatur, Illinois | 15.0 | 15.0 |
| Sorbic Acid | 3.5 | 3.5 |

-continued

| Ingredient | Wt. (lb.) | % by wt. of Starch Compos. |
|---|---|---|
| Titanium Dioxide | 2.0 | 2.0 |
| Salt | 2.0 | 2.0 |
| Carboxy/methyl-cellulose | 1.0 | 1.0 |
| TOTAL | 100.00 | 100.0 |

The 100 lbs. of starch composition was blended with the aqueous syrup for about 20 seconds to form a substantially smooth mixture without lumping of the starch. Following complete mixing of the starch composition, 100 lbs. of water at a temperature of 60°-80° F. was added to the mixture of the aqueous syrup and starch composition in order to hydrate and swell the starch. Hydration of the starch was achieved after about 70 seconds of additional mixing.

Separately, 3.00 lbs. of gelatin was dissolved in 20.00 lbs. of boiling water which was then added to the slurry mixer. The hydrated gelatin solution was blended into the starch and syrup mixture for about 30 seconds.

After the gelatin addition, the following ingredients were added to the above in the indicated amounts:

| Ingredients | Weight (lb.) |
|---|---|
| Vegetable Shortening containing 2.5% Triglycerol Monosterate | 123.0 |
| Water (ice) | 45.00 |
| Sugar | 319.0 |
| Spray Dried Mix of Microcrystalline Cellulose and Whey | 20.0 |
| Sodium Caseinate | 10.0 |
| Non-Fat Dry Milk | 5.0 |
| Sodium Stearoyl Lactylate | 2.0 |

The above material was blended with the starch and syrup mixture for about 90 seconds to form a smooth non-aerated creme filling. The slurry at this point had a temperature of about 80°-85° F. and a specific gravity of about 0.85-1.0. The increase in temperature was a result of frictional heat produced by blending of the various ingredients in the slurry mixer.

The above slurry was pumped to a continuous mixer which was operated at about 120 rpm in order to aerate the creme to a specific gravity of about 0.64-0.66. The slurry during aeration had a temperature of about 95°-102° F.

The aerated creme had a fat content of about 12.5% which was a significantly reduction in the level of fat compared to a conventional aerated creme used as a filling for snack cakes. Conventional cremes typically have a fat level of about 25% by weight. The reduced-fat aerated creme produced as above had a smooth homogeneous texture with a creamy appearance and taste.

EXAMPLE 2

A 500 lb. batch of an aerated reduced-fat creme filling was prepared in a mixing bowl according to the following procedure:

50 lbs. of the starch composition produced as described in Example 1 was blended with 105 lb. of corn syrup (63 DE) for about 1 minute to form a substantially smooth "paste" like mixture. This was followed by the addition of 1.5 lb. of Butter Lemon Vanilla Flavoring and 50 lbs. of water at ambient temperature in order to hydrate the starch. Mixing of the water was carried out for about 4 minutes.

1.5 lb. of gelatin dissolved in 10 lbs. of boiling water was added to the mixture and was blended for 1 minute.

The following dry ingredients were separately blended in the indicated amounts.

| Ingredients | Weight (lb.) |
|---|---|
| Sugar | 20.0 |
| Sodium Caseinate | 5.0 |
| Blend of Microcrystalline Cellulose and Whey | 10.0 |
| Non-Fat Dry Milk | 2.5 |
| Sodium Steroyl Lactylate | 1.0 |

Separately, 139.5 lbs. of sugar was added to the hydrated starch composition in the Bowl mixer which was then mixed for 1 minute. This was followed by the addition of the above dry mixture which was blended for an additional 2 minutes.

61.5 lbs. of a vegetable shortening containing 2.5% by weight triglycerol monostearate was added to the mixture followed by mixing for 2 minutes. This was followed by the addition of 42.50 lbs. of ambient temperature water which was mixed at low speed until dispersed. The mixture was blended at a constant speed (ranging from 125-150 rpm) until a smooth creme was formed. The creme at this point had a temperature of about 80°-85° F. and a specific gravity of 0.75-0.77. The creme was transformed to a continuous mixer which was operated at about 120 rpm in order to aerate the creme to a specific gravity of about 0.64-0.66.

The aerated, reduced-fat creme was suitable for use as a filling or additive for a snack cake.

The above Examples represent specific but non-limiting embodiments of the present invention and it is intended to include within the scope of the present invention all reasonable equivalents, variations or additions thereto.

We claim:

1. A process for the production of an aerated reduced-fat creme comprising:
    (a) blending a starch composition comprising about 50 to 80% sugar on a dry weight basis and about 20 to 50% of pregelatinized instant starch on a dry weight basis with about 20 to 25% by weight of an aqueous syrup comprising about 15 to 25% by weight of the creme of a syrup and about 0-5% by weight of the creme of water followed by;
    (b) adding sufficient water to said mixture in order to substantially hydrate the starch; followed by;
    (c) adding vegetable shortening in an amount of at least about 8% by weight of the creme, an emulsifier composition which comprises a combination of a polyglycerol ester and an alkali stearoyl lactylate, and about 20 to 33% sugar by weight of said creme to said mixture;
    (d) blending the shortening into said mixture to form a creme; and
    (e) aerating said mixture.

2. A process as set forth in claim 1 wherein said vegetable shortening is added in an amount of about 8 to 13% by weight of said creme.

3. A process as set forth in claim 1 wherein the emulsifier composition comprises about 0.27 to 0.34% by weight of the creme of a polyglycerol ester and about 0.1 to 0.2% by weight of the creme of an alkali stearoyl lactylate.

4. A process as set forth in claim 3 wherein the alkali stearoyl lactylate is a sodium stearoyl lactylate.

5. A process as set forth in claim 1 wherein the creme includes gelatin in an amount sufficient to improve the shelf stability of said creme.

6. A process as set forth in claim 1 wherein aeration is carried out in order to reduce the specific gravity of said creme to below about 0.7.

7. A process as set forth in claim 6 wherein the specific gravity is reduced to about 0.6–0.65.

8. A process as set forth in claim 1 wherein the polyglycerol ester is triglycerol monostearate.

9. A process as set forth in claim 1 wherein sodium caseinate and non-fat dry milk are added to said creme.

10. A process as set forth in claim 1 wherein the creme includes a preservative and salt.

11. A process as set forth in claim 1 wherein the syrup is corn syrup.

12. A process as set forth in claim 11 wherein the corn syrup has a DE of about 42 to 95.

13. A process as set forth in claim 1 wherein the water added to hydrate the starch is at about ambient temperature or below.

14. A process as set forth in claim 1 wherein the water added to hydrate the starch is added in an amount of about 5 to 15% by weight of the creme.

* * * * *